United States Patent [19]

Spielmann

[11] 4,429,531
[45] Feb. 7, 1984

[54] MASTER CYLINDER FOR BRAKE OR CLUTCH

[75] Inventor: Norbert Spielmann, Ebern, Fed. Rep. of Germany

[73] Assignee: FAG Kugelfischer Georg Schäfer & Co., Schweinfurt, Fed. Rep. of Germany

[21] Appl. No.: 360,649

[22] Filed: Mar. 22, 1982

[30] Foreign Application Priority Data

Mar. 24, 1981 [DE] Fed. Rep. of Germany ....... 3111411

[51] Int. Cl.³ .............................................. B60T 11/22
[52] U.S. Cl. .......................................... 60/588; 92/169
[58] Field of Search ................. 60/588, 589, 592, 587, 60/585; 92/169, 82, 107, 162 R, 85 R, 163

[56] References Cited

U.S. PATENT DOCUMENTS

| 2,377,017 | 5/1945 | Lacoe | 60/588 |
| 2,396,155 | 3/1946 | Christensen | 60/588 |
| 3,473,330 | 10/1969 | Fritz | 60/588 |

FOREIGN PATENT DOCUMENTS

| 228035 | 7/1959 | Australia | 92/82 |
| 1655308 | 8/1971 | Fed. Rep. of Germany | |

Primary Examiner—Robert E. Garrett
Assistant Examiner—Scott Moritz
Attorney, Agent, or Firm—Karl F. Ross; Herbert Dubno

[57] ABSTRACT

A brake or clutch master cylinder has a slightly stepped bore with angularly equispaced grooves extending from the large diameter step into the small diameter step across the seal of the piston in its rest position. The fluid reservoir communicates with a groove of the large diameter step via a radial port.

9 Claims, 5 Drawing Figures

MASTER CYLINDER FOR BRAKE OR CLUTCH

FIELD OF THE INVENTION

My present invention relates to a master cylinder for a hydraulic device and, more particularly, to a master cylinder for a brake or clutch.

BACKGROUND OF THE INVENTION

In hydraulically actuated devices, e.g. servo-mechanisms, clutches and brakes, it is a common practice to provide a fluid-displacement device in the form of a cylinder in which a piston is displaceable to generate a fluid pressure which is transmitted by an outlet port to the controlled device.

In a brake system, for example, this cylinder is referred to as a master cylinder and generally communicates at one end with a brake line and laterally via a reservoir port with a chamber, i.e. the brake fluid reservoir, adapted to receive fluid from the chamber when the piston is retracted beyond this latter port which is closed off from the cylinder upon an actuating displacement of the piston.

It is known to provide, in the region of this port, a recess or the like which can provide temporary communication between the chamber of the cylinder on the leading side of the piston seal or cup, and a region behind it at least during the start of the stroke of the piston.

Such a system, whose recess flanks rise with a shallow slope toward the deep portion of the recess, is described, for example, in U.S. Pat. No. 3,473,330, and German patent document No. 1,655,308.

The principles described are applicable not only to brake master cylinders, but also to other hydraulic actuators such as the cylinders used for actuating clutches, servo-mechanisms and the like.

While this master cylinder, or more generally actuating cylinder, was found to be highly effective for the purposes described in these publications, widespread use was prevented by the difficulty of forming the recess with flanks of shallow slope as there-described.

Specifically, the master cylinder could not be formed by a pressure casting (die casting) or injection molding process without expensive subsequent machining, or with inexpensive mold and techniques.

In many cases, therefore, while the principles could be used with considerable effect, the prohibitive fabrication costs and complex preparation process precluded such use.

OBJECTS OF THE INVENTION

It is the principal object of the present invention to provide a brake master cylinder in which these disadvantages are obviated.

Another object of the invention is to provide a low cost, economically fabricated master cylinder which permits operation in accordance with the above-mentioned principles and yet is more versatile and effective.

Still another object of this invention is to provide a highly reliable brake master cylinder which can be fabricated by die casting or injection casting process utilizing simple molds or dies, and which also is characterized by low piston-seal (cup) wear.

SUMMARY OF THE INVENTION

These objects and others which will become apparent hereinafter are attained by providing an actuating cylinder for a hydraulic device which comprises a body formed with a cylinder bore in which an actuating piston is displaceable, and a transverse port connecting this bore with the equalization chamber or reservoir.

According to the invention, this bore is slightly stepped and has its small diameter step terminating ahead of the large diameter step which is upstream of the small diameter step with respect to the direction of the displacement of the piston for force application. According to the invention, moreover, at least one elongated recess reaches from the large diameter step into the small diameter step beyond the lateral port, this recess being preferably a longitudinally extending groove. This recess preferably lies in the region of and is intersected by the axis of the port.

Naturally, a number of such grooves can be provided and at least one of them is the groove which intersects the axis of the lateral port.

In the rest position of the piston, the sealing cup thereof lies between the port and the end of the groove at the pressure side of the bore, i.e. the large diameter step thereof.

It has been found to be advantageous to form the transition shoulder between the large diameter step and the small diameter step as a frustoconical surface which naturally converges toward the small diameter step.

The flanks of the groove or recesses may also be beveled at their ends turned toward the pressure side of the device.

While in a preferred embodiment of the invention the grooves are of constant width and extend axially, it is also possible, in accordance with a feature of the invention, to incline the grooves to the cylinder axis and preferably to impart a helical or screw configuration to the grooves.

As indicated, and as will be discussed below, the master cylinder because of its groove configuration can be readily produced by die-casting or injection molding and therefore may even be formed from thermoplastic synthetic resin. The die-casting or injection molding operation can utilize an axially extending core which is axially withdrawn.

It has also been found to be advantageous to connect the port with the groove intersecting its axis by interposing between them an enlargement or widening of the port in the region of the groove, this enlargement being referred to hereinafter as a compartment.

The stepping of the bore and the connection of the equalization port with the pressure chamber through one or more axially extending or inclined grooves in the manner described provides an effective connection between the pressure chamber and the equalization system while avoiding undercuts which have to be machined or the like. The grooves can be of relatively small depth and width, and fabricated with minimum concern for tolerances as to the groove configuration or the rest position of the piston.

The conical configuration of the transition between the steps keeps wear of the sealing cup or sleeve to a minimum and the inclined orientation of the grooves also contributes to this advantage.

The interposition of a compartment between the radial port and the bore, especially when the compartment is located such that it does not reach the seal, facilitates fabrication.

BRIEF DESCRIPTION OF THE DRAWING

The above and other objects, features and advantages of the present invention will become more readily apparent from the following description, reference being made to the accompanying drawing in which.

SPECIFIC DESCRIPTION OF THE DRAWING

Figure 1:
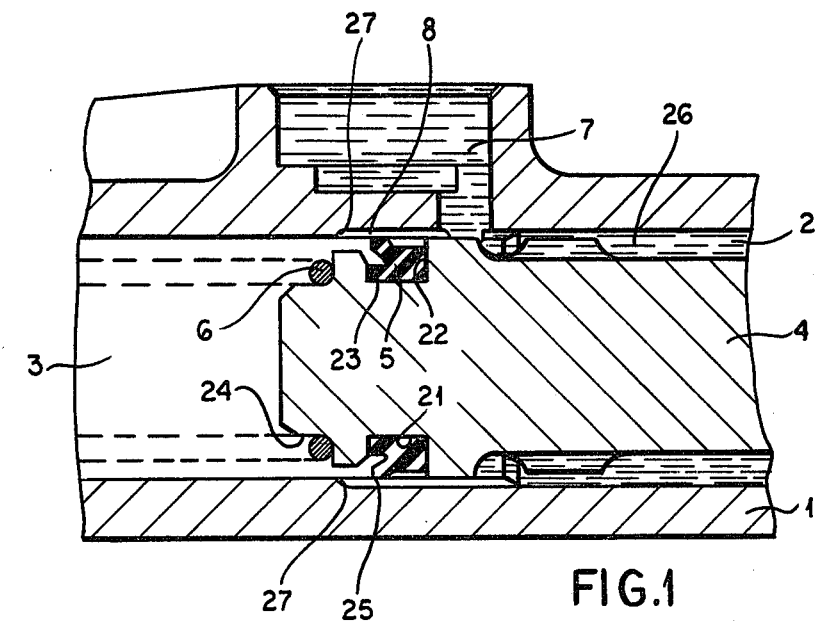
FIG. 1 is an axial cross-sectional view through a portion of a brake master cylinder embodying the invention, in the region of the equalization port and showing the pressure end of the piston in its rest position.

FIG. 1 shows a master cylinder, according to the invention, provided with a stepped cylinder bore whose large diameter step 2 merges with a small diameter step 3 at a frustoconical transmission flank or shoulder 20 slightly upstream of an equalization port 9 connecting the cylinder bore with a brake fluid reservoir 7. The small diameter step is connected, at its left-hand end not shown in the drawing with a brake line via a conventional master-cylinder check valve.

The cylinder body 1 can be injection molded from a synthetic resin material or die cast around a core which is axially retracted to the right relative to this body.

The piston 4 is axially displaceable in the cylinder bore and has a sealing cup or sleeve 5 of conventional design lodged in a groove 21 between a shoulder 22 and a flange 23. A compression-type coil spring 6 surrounds a boss 24 at the pressure end of this piston and is seated against the flange 23.

To actuate the brake, therefore, the piston 4 is shifted to the left to displace fluid from the small diameter step 3 into the brake line.

From the large diameter step 2, axial grooves 8 extend beyond the port 9 into the small diameter step 3, at least one of these grooves intersecting the radial axis of the port 9.

In the rest position of the piston 4, the lip 25 of the sealing cup 5 lies at an intermediate location along the length of these grooves so that all of the grooves permit fluid communication between the annular clearance 26, between the piston and the large diameter bore 2, with the small diameter bore 3 ahead of this seal.

Both bores are thus filled with the pressure medium.

When the piston is shifted to the left to actuate the brake or clutch, pressure develops in the bore 3 as soon as the lip 25 has passed over the beveled flank 27 at the end of the groove 8.

It is also possible to have the port 9 open into the large diameter bore 2 directly, although this system has the disadvantage that it requires a somewhat greater length of the master cylinder.

Figure 2:
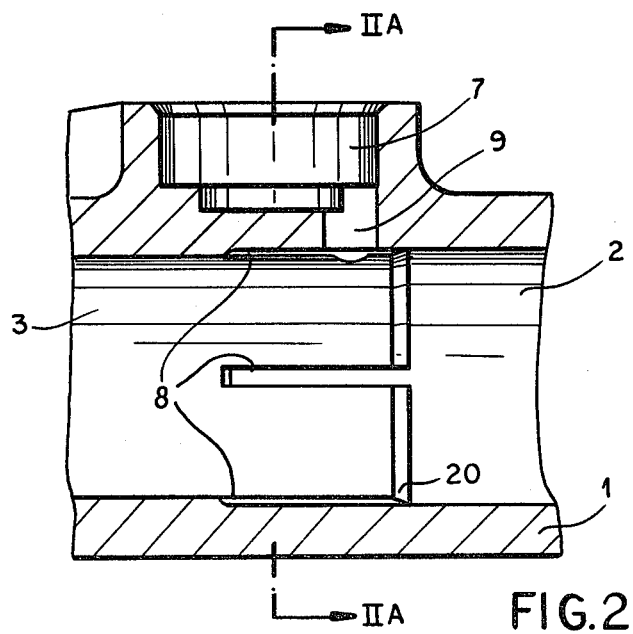
FIG. 2 is a similar section with the piston and its restoring spring removed, showing the grooves and step bore arrangement of the present invention.
Figure 2A:
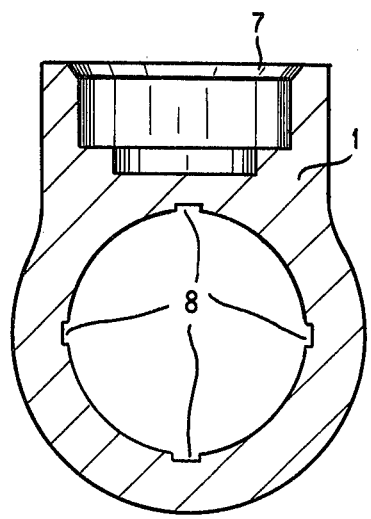
FIG. 2A is a transverse section taken along the line IIA—IIA of FIG. 2.

As can be seen from FIGS. 2 and 2A, the grooves 8 are angularly spaced around the axis of the cylinder bores.

Figure 3:
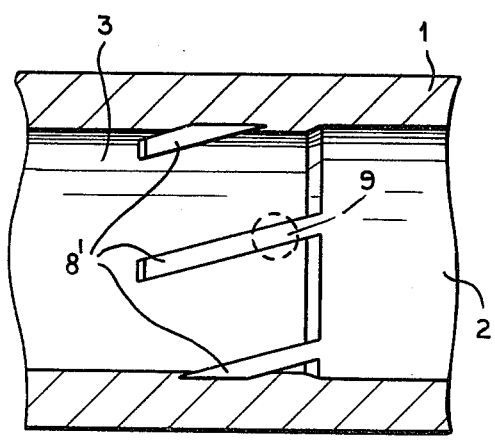
FIGS. 3 and 4 are sections taken at right angles to the section of FIG. 2 through other modifications of the master cylinder.

The arrangement shown in FIG. 3 provides grooves 8' which are inclined to the cylinder axis and can have a helical or screw-shape orientation. This arrangement has been found to improve the movement of the sealing sleeve across the groove and to reduce wear.

Apparently the sleeve rotates upon the piston as the latter is axially displaced and this contributes as well to the low wear.

Figure 4:
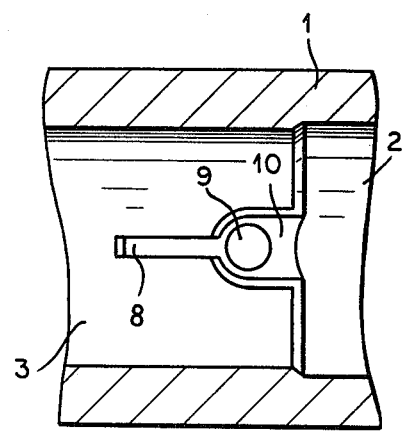

In the embodiment of FIG. 4 the radial port 9 does not directly reach to the sealing sleeve 5 but rather opens into a recess or enlargement (compartment) 10 in a groove 8. This permits forming the radial port without burrs or the like.

I claim:

1. An actuating cylinder for a hydraulic device, comprising:
    a cylinder body formed with a slightly stepped cylinder bore having a large diameter step and a small diameter step, the small diameter step being connectable to a device to be actuated;
    means including an equalization port and a fluid reservoir opening laterally into said bore;
    a piston axially shiftable in said bore and formed with a seal engaging the wall of said bore, said wall being formed with at least one groove reaching from said large diameter step into said small diameter step past said seal in a rest position of said piston.

2. The actuating cylinder defined in claim 1, wherein a frustoconical transverse flank is provided between said steps.

3. The actuating cylinder defined in claim 1 wherein said groove has at its end in said small diameter step, a beveled flank.

4. The actuating cylinder defined in claim 1, claim 2 or claim 3 wherein said groove is inclined to the cylinder axis.

5. The actuating cylinder defined in claim 4 wherein said groove is helical.

6. The actuating cylinder defined in claim 1, claim 2 or claim 3 wherein said port opens into a compartment communicating with said bore.

7. The actuating cylinder defined in claim 1, claim 2 or claim 3 wherein a plurality of said grooves is provided in said walls in angularly equispaced relation.

8. A method of making the actuating cylinder defined in claim 1 which comprises pressure molding said body around a core and axially separating said core and the molded body.

9. The method defined in claim 8 wherein said body is molded from a thermoplastic synthetic resin.

* * * * *